(12) United States Patent
Sollars

(10) Patent No.: US 6,178,482 B1
(45) Date of Patent: Jan. 23, 2001

(54) VIRTUAL REGISTER SETS

(75) Inventor: Donald L. Sollars, Milpitas, CA (US)

(73) Assignee: Brecis Communications, San Jose, CA (US)

(*) Notice: Under 35 U.S.C. 154(b), the term of this patent shall be extended for 0 days.

(21) Appl. No.: 08/963,391

(22) Filed: Nov. 3, 1997

(51) Int. Cl.[7] .................................................. G06F 12/00
(52) U.S. Cl. .......................................... 711/129; 711/202
(58) Field of Search .............................. 711/5, 3, 6, 109, 711/118, 129, 203, 214–215

(56) References Cited

U.S. PATENT DOCUMENTS

| | | | |
|---|---|---|---|
| 4,525,780 | 6/1985 | Bratt et al. | 711/113 |
| 4,905,141 | * 2/1990 | Brenza | 711/129 |
| 5,287,490 | 2/1994 | Sites | 717/5 |
| 5,404,469 | 4/1995 | Chung et al. | 712/215 |
| 5,430,862 | 7/1995 | Smith et al. | 712/204 |
| 5,438,668 | 8/1995 | Coon et al. | 345/522 |
| 5,568,401 | 10/1996 | Narayanaswami | 345/522 |
| 5,574,873 | 11/1996 | Davidian | 712/200 |
| 5,574,927 | 11/1996 | Scantlin | 712/200 |
| 5,742,802 | 4/1998 | Harter et al. | 712/200 |

OTHER PUBLICATIONS

*Computer Architecture and Quantitative Approach*; Authors: John L. Hennessy, David A. Patterson; Morgan Kaufmann Publishers, Inc., 1990, Chapter 3, entitled "Instruction Set Design: Alternatives and Principles", pp. 89–137.

*Computer Architecture and Quantitative Approach*; Authors: John L. Hennessy, David A. Patterson; Morgan Kaufmann Publishers, Inc., 1990, Chapter 5, entitled "Basic Processor Implementation Techniques", pp. 199–248.

* cited by examiner

*Primary Examiner*—John W. Cabeca
*Assistant Examiner*—Denise Tran
(74) *Attorney, Agent, or Firm*—Blakely Sokoloff Taylor & Zafman LLP (57) ABSTRACT

One or more sets of one or more cache lines of cache locations of an apparatus, such as a processor, a system embedded with a processor, and the like, are dynamically operated at the same or different time periods as different register sets to supply source operands and to accept destination operands for instruction execution. The different register sets may be of the same or of different virtual register files, and if the different register sets are of different virtual register files, the different virtual register files may be of the same or of different architectures. The cache locations implementing the registers may be directly accessed using cache addresses or content addressed using memory addresses.

17 Claims, 5 Drawing Sheets

VIRTUAL REGISTER SETS

BACKGROUND OF THE INVENTION

1. Field of the Invention

The present invention relates to the field of processors. More specifically, the present invention relates to the art of instruction execution practiced on processors.

2. Background Information

Prior art approaches to instruction execution practiced by processors can be broadly classified into three approaches based on the manner operand storage is handled. Broadly defined, the three approaches are stack based approach, accumulator based approach and register based approach. Stack, accumulator and registers are different functional forms of temporary storage medium employed in processor datapaths, which in addition to the temporary storage medium, includes arithmetic logic units (ALU) and so forth. Register is characterized by their symbolic designations through register identifiers, i.e. R1, R2 and so forth. The term processor as used herein in the present specification is intended to include micro-controllers (MCU), digital signal processors (DSP), general purpose microprocessors (uP), and the like, whereas the term instruction as used herein is intended to include macro-instructions visible to programmers or compiler writers as well as micro-instructions, micro-operations, or primitive operations and the like that are not visible to programmers and compiler writers.

In the case of the stack based approach, one of the source as well as the destination operand of an instruction are implicitly defined to be located at the top of the stack, whereas, in the case of the accumulator based approach, one of the source as well as the destination operand of an instruction are implicitly defined to be located in the accumulator. Typically, the other source operand is located in a register. In the case of the register set based approach, the source and the destination operands of an instruction are either located in registers or in memory locations. While registers are specified by their identifiers, memory locations, whether cached or not, are specified by either physical or virtual addresses, depending on the manner in which memory is managed.

While the stack based approach enjoys the advantage of providing a simple model for expression evaluation, and short instruction, the approach suffers from at least the disadvantages of forcing all the operands onto the stack, and yet not being able to randomly access the pushed down operands in the stack, resulting in inefficient coding. As to the accumulator approach, while it minimizes the internal states of a processor, and provides for short instructions, it also suffers from at least the disadvantage of very high memory traffic, since the accumulator is the only temporary storage. The register based approach has the advantage of being the most general model for code generation, however, because of the access and related circuitry required to support a register, most prior art register based processors tend to provide only a limited number of registers, resulting in a relatively small working set. The disadvantage becomes especially limiting for heavily pipelined super-scalar processors.

Thus, a more efficient and effective approach to instruction execution without some of the disadvantages of the prior art approaches is desired.

SUMMARY OF THE INVENTION

One or more sets of one or more cache lines of cache locations of an apparatus, such as a processor, a system embedded with a processor, and the like, are dynamically operated at the same or different time periods as different register sets to supply source operands and to accept destination operands for instruction execution. The different register sets may be of the same or of different virtual register files, and if the different register sets are of different virtual register files, the different virtual register files may be of the same or of different architectures. The cache locations implementing the registers may be directly accessed using cache addresses or content addressed using memory addresses.

In one embodiment, first one or more cache lines of cache locations are dynamically operated as registers of a first register set of a first virtual register file of a first architecture during a first time period, and as a second register of a second virtual register file of a second architecture set during a second time period. In another embodiment, second one or more cache lines of cache locations are dynamically operated as registers of the second register set of the second virtual register file of the second architecture during the second time period instead. In yet another embodiment, the first and second time periods, where the first and second one or more cache lines of cache locations are dynamically operated as registers of the first and second register sets of the first and second virtual register files of the first and second architectures, are the same time period. In each of these embodiments, the first and second virtual register files may be the same or different virtual register files, and if the first and second virtual register files are different virtual register files, the first and second architectures may be the same or different architectures.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. Those skilled in the art will also appreciate that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Figure 1:
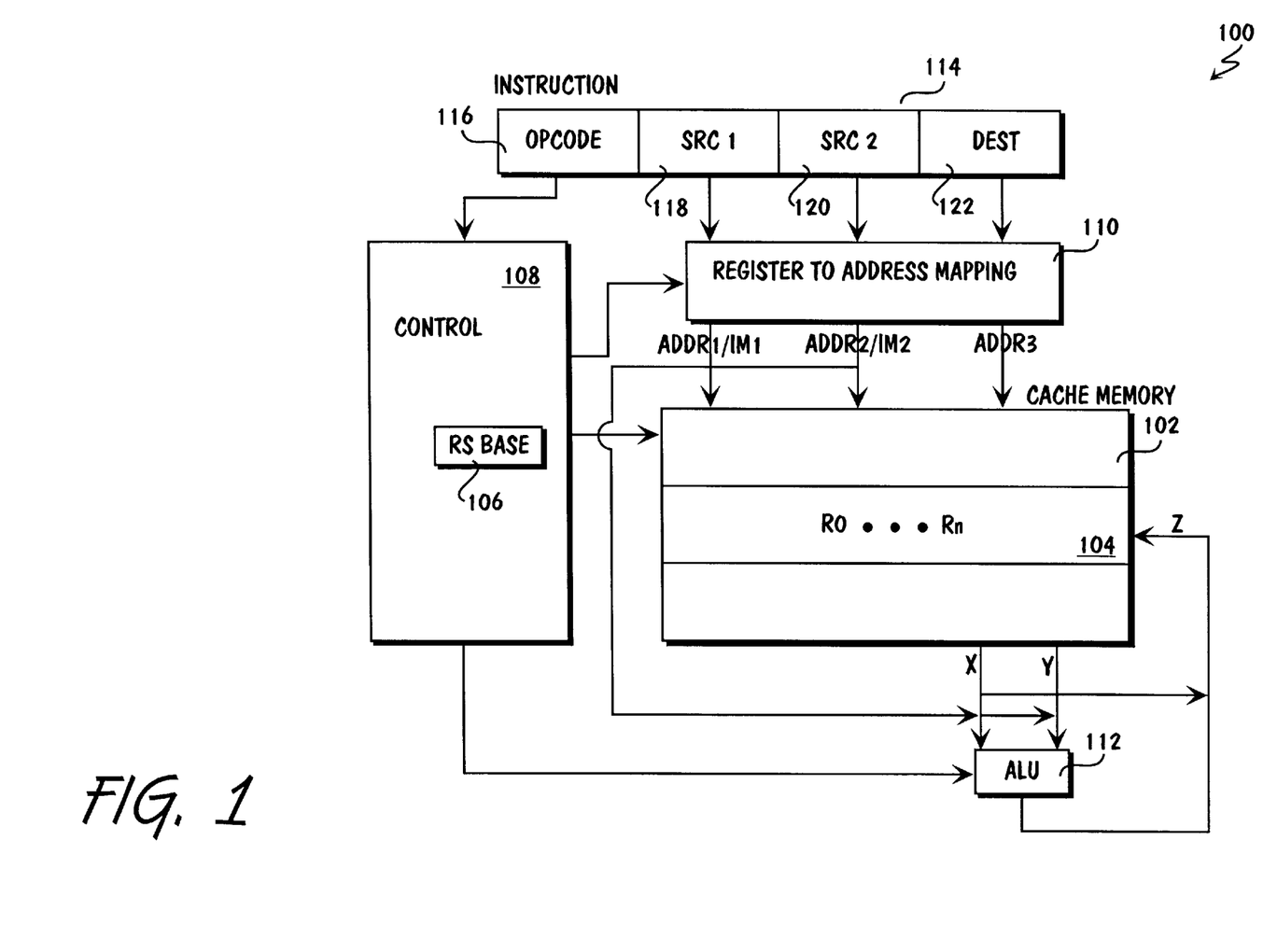
FIG. 1 illustrates one embodiment of an exemplary processor incorporated with the teachings of the present invention.

Referring now to FIG. 1, wherein a block diagram illustrating an exemplary processor incorporated with the teachings of the present invention is shown. As shown, exemplary processor 100 includes cache memory 102 having a plurality of cache lines of cache locations, including cache lines 104. For the illustrated embodiment, processor 100 is a standalone integrated circuit (chip). In an alternate embodiment, processor 100 is embedded as an integral part of a larger design disposed on one or more chips.

For the illustrated embodiment, each of cache lines 104 of cache memory 102 includes a data portion having a number of cache locations for storing data, and a tag portion for storing an address tag for the data stored in the corresponding cache locations. Data stored into the cache locations may be retrieved specifically using cache addresses of the cache locations or through content addressing using memory addresses of the data. Memory addresses may be physical or virtual, dependent on the memory architecture of a particular implementation. Additionally, cache memory 102 also includes two read ports (X and Y) and one write port (Z). The outputs on read ports X and Y may be by-passed to write port Z. Except for the teachings of the present invention incorporated in cache memory 102, to be more fully described below, cache memory 102 is intended to represent a broad category of cache memory known in the art.

Furthermore, exemplary processor 100 includes control unit 108, mapping unit 110 and arithmetic logic unit 112, coupled to cache memory 102 and each other as shown. The functions of control unit 108 and mapping unit 110 are described below. As will be apparent from the description to follow, control unit 108 and mapping unit 110 may be implemented in hardware or firmware or combination, employing any number of circuitry and/or programming techniques known in the art. ALU 112 is intended to represent a broad category of ALU known in the art.

In accordance with the present invention, control and mapping units 108 and 110 together dynamically operate one or more sets of one or more cache lines of cache locations of cache memory 102 at the same or different time periods, as different register sets to supply source operands and to accept destination operands for instruction execution. As will be described in more detail below, the different register sets may be of the same or of different virtual register files, and if the different register sets are of different virtual register files, the different virtual register files may be of the same or of different architectures.

For the embodiment illustrated in FIG. 1, cache lines 104 are dynamically operated as registers of a first register set of a first virtual register file of a first architecture during a first time period, and as a second register set of a second virtual register file of a second architecture during a second time period. See also FIG. 2, where the first and second register sets are illustrated as elements 202 and 204, and the first and second virtual register files are illustrated as elements 206 and 208. In each case, register set 202/204 may be the only register set of virtual register file 206/208. Virtual register files 206 and 208 may be the same virtual register file, and by definition, of the same architecture. If virtual register files 206 and 208 are different virtual register files, they may also be of different architectures. Thus, cache lines 104 are designed to contain sufficient cache locations to accommodate the largest register set to be supported for a particular implementation. In cases where the cache locations are dynamically operated for the smaller register sets, a subset of the cache locations will be employed then. Note that cache lines 104 may be a single cache line.

Figure 2:
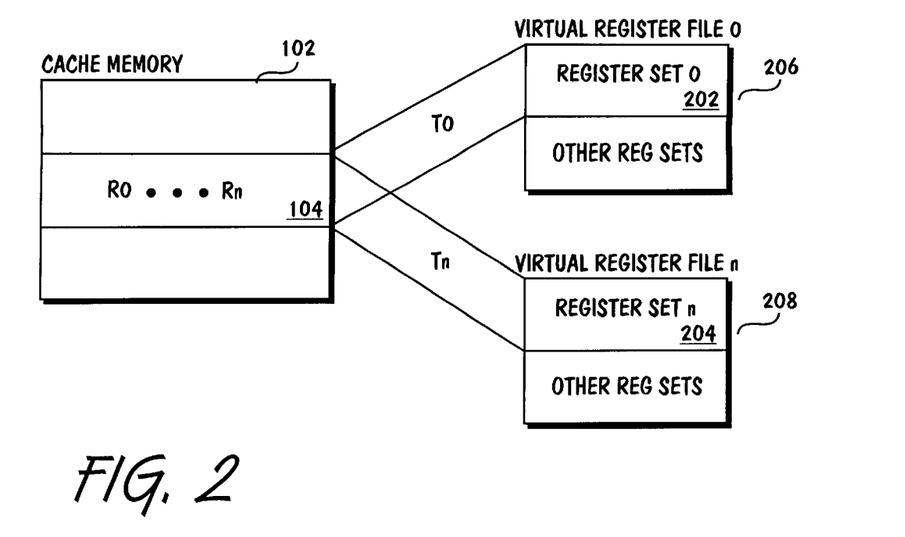
FIG. 2 illustrates the concept of employing a collection of cache lines to implement different register sets at different times in further details.

An example of virtual register files 206 and 208 being the same virtual register file is using exemplary processor 100 for multiple context applications. An example of virtual register files 206 and 208 being different virtual register files of the same architecture is using exemplary processor 100 for homogeneous multi-processor applications. An example of virtual register files 206 and 208 being different virtual register files of different architectures is using exemplary processor 100 for heterogeneous multi-processor applications.

Each instruction 114 comprises opcode 116 and one or more operand specifications, source operands 118 and 120 and destination operand 122. Opcode 116 specifies the operation to be performed, which may be any one of a number arithmetic or logic operations. Operands 118–122 specify the operands to be employed for the specified operation. Note that source and destination operands 118–122 designate the registers containing the operands, not the identity of the operands. (In other embodiments, operands 118–122 may designate the memory addresses of the memory locations containing the operands instead.) For some operations, a constant (also referred to as an immediate) may be specified in lieu of a register specification.

Figure 3:
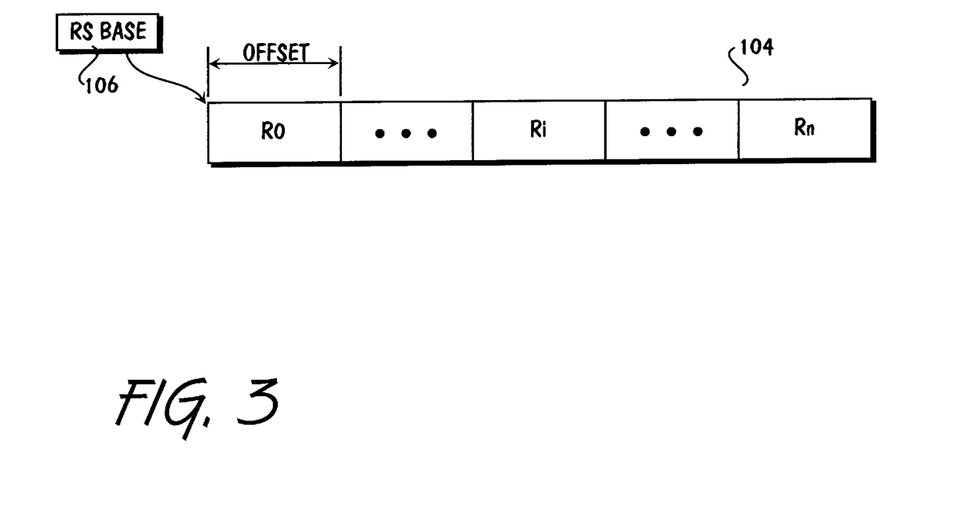
FIG. 3 illustrates mapping of a register designation to a cache address.

In response, for the illustrated embodiment, control unit 108 and mapping unit 110 cooperate to map register specifications 118–122 to cache addresses of the cache locations being used as the registers of the current register set, and output the mapped cache addresses for cache memory 102. Constants or immediates are by-passed to the ALU directly. For the illustrated embodiment, control unit 108 maintains base address 106 of the cache locations being used as registers of the current register set, and mapping unit 110 determines an appropriate offset for each register designation, and apply the determined offsets to base address 106 to arrive at the correct cache addresses for the cache locations being used as registers of the current virtual register set. (See FIG. 3.) Determining the appropriate offset may be accomplished employing a number of techniques known in the art. For example, employing a functional relationship between register designation and offset, maintaining an offset mapping table in storage locations internal or external to mapping unit 108. Applying the determined offsets to base address 106 may be accomplished through any one of a number of arithmetic and/or logical operations. In turn, cache memory 102 outputs the contents of the appropriate "source registers" on its read ports, and accept the result of the specified ALU operation through the write port, and store the accepted result in the appropriate "destination register".

In an alternate embodiment, the cache locations being operated as registers of the current register set are accessed by content addressing cache memory 102. A set of special address tags are stored in the tag portions of cache lines 104, and together, control unit 108 and mapping unit 110 cooperate to map register designations to address tags instead. Preferably, the set of special address tags identify "addresses" that are outside the user address space, effectively rendering cache lines 104 to be inaccessible to user programs (other than as registers), thereby preventing accidental or unintended modification of the content of these cache lines. Other integrity measures may also be employed.

When it is time to use cache lines 104 for registers of a different register set, of the same or different virtual register files, control unit 108 causes cache memory 102 to save the current content of cache lines 104 into memory. additionally, if cache lines 104 have previously been used as registers for the register set, control unit 108 causes cache memory 102 to restore the saved content of cache lines 104 before resuming usage of cache lines 104 for the register set.

Accordingly, exemplary processor 100 accomplishes instructions execution without employing a stack, an accumulator or a physical register file, as prior art processors. Those skilled in the art will appreciate that the present invention is highly scalable and may be used for register sets as well as virtual register files of different sizes. It is anticipated that when provided with proper control logic for controlling interleaving execution of instructions of different legacy instruction architecture set, exemplary processor 100 is particularly suitable as a replacement processor for multiple older generation processors of different architectures employed in legacy applications, e.g., in wireless communications where older generations of MCU and DSP of different architectures are often employed. Before we further describe the present invention, it should also be noted that while for ease of understanding, control unit 108 and mapping unit 110 are shown as two separate units, those skilled in the art will appreciate that the present invention may be practiced with control unit 108 and mapping unit 110 implemented as one or more units. Also, while two read ports and one write port are provided to cache memory 102, and only one ALU 112 is shown, the present invention may also be practiced with more or less read/write ports as well as multiple ALU 112.

Still referring to FIG. 1, for the illustrated embodiment, the remaining cache lines of cache memory 102 are also used to cache data, just like other conventional cache memory, while cache lines 104 are being used as registers of different register sets. Similar special address tags described earlier for the alternate content addressed embodiment are also stored in the tag portions of cache lines 104 to protect the content of cache lines 104 from accidental or unntended modification. The address tags stored in the tag portions of the cache lines also include various control bits, in particular, a control bit for denoting "locking down" of a cache line, if the cache line is to be dynamically operated as register or registers of a register set. A cache line is "locked down" by removing it from being considered for reallocation. In other embodiments, a number of other alternate "lock down" approaches may also be used.

Figure 4:
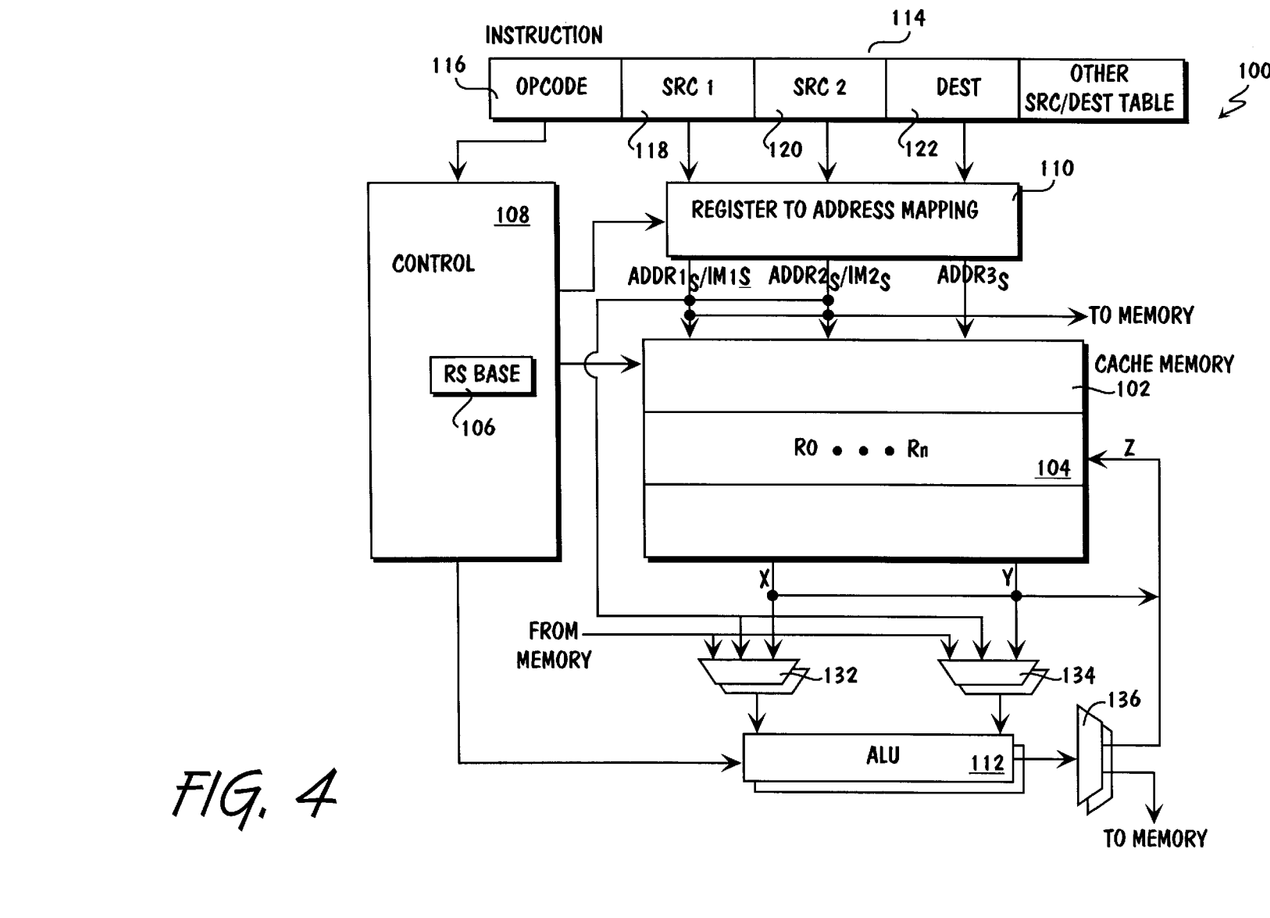
FIGS. 4–6 illustrate various alternate embodiments of FIG. 1.

FIG. 4 illustrates an alternate embodiment, where in addition to register specifications, source and destination operands 118–122 may specify memory addresses of the memory locations containing the operands instead. (Note that as described earlier, source and destination operands 118–122 do not identify the operands.) In other words, the alternate embodiment illustrated in FIG. 4 supports arithmetic and logic operations involving register(s) and memory location(s), as well as memory locations only. Note that if cache memory 102 is also used to perform conventional caching, the designated memory location data is actually retrieved from cache memory 102 if the data is already cached in cache memory 102. Furthermore, each instruction may specify multiple tuples of source and destination operands, i.e. single instruction multiple data (SIMD). The embodiment illustrated in FIG. 4 is substantially the same as the embodiment illustrated in FIG. 1, except for selectors 132–136, which are introduced to handle reading and writing source operands to and from memory, additional ALU introduced to handle multiple data per instruction.

Figure 5:
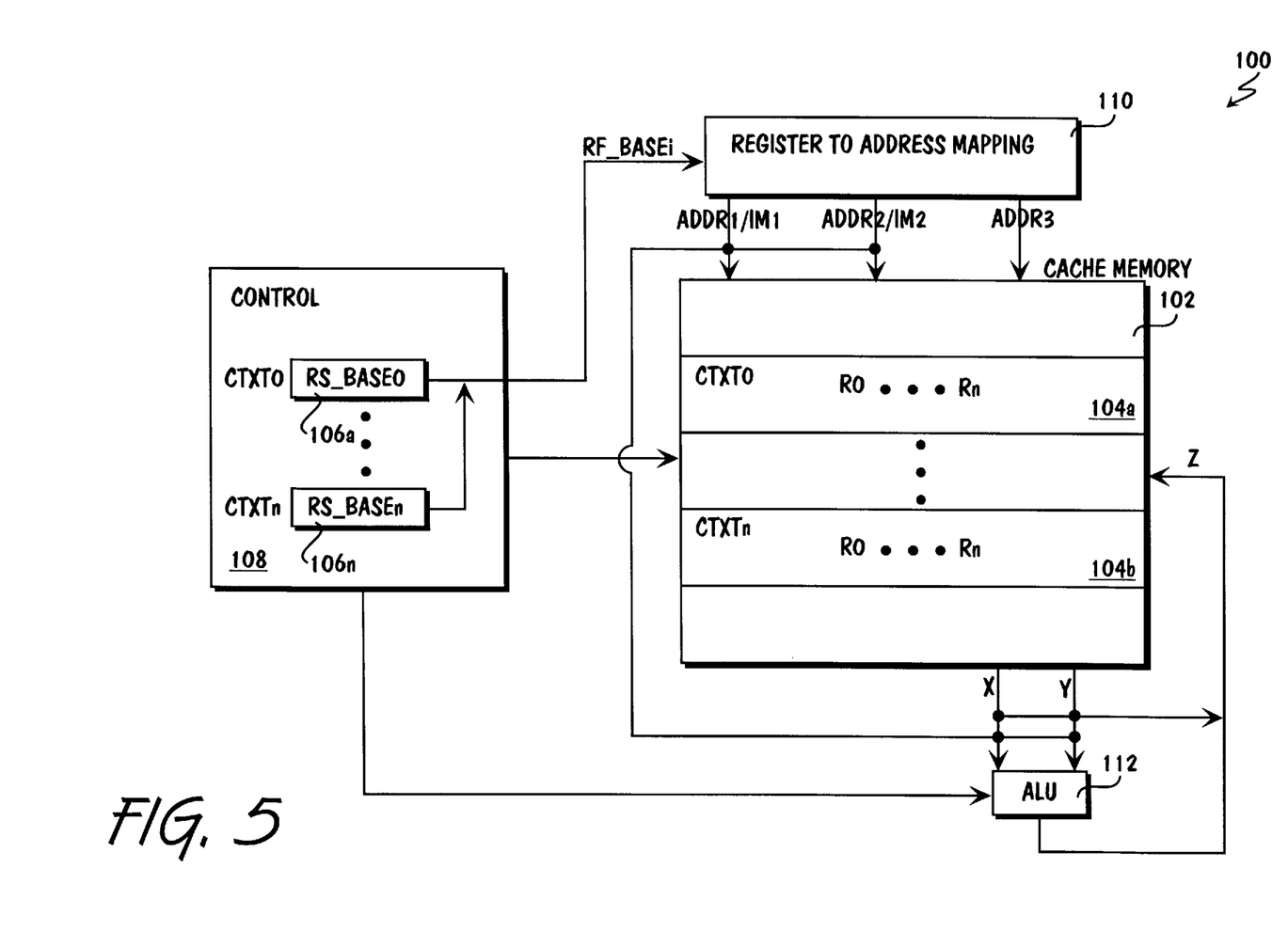

FIG. 5 illustrates yet another embodiment, where a first collection of one or more cache lines of cache locations 104a are dynamically operated as registers of a first register set of a first virtual register file during a first time period, and a second collection of one or more cache line of cache locations 104b are dynamically operated as registers of a second register set of a second virtual register file during a second time period. Similar to the earlier described embodiments, the first and second virtual register files may be the same or different virtual register files, and if they are different, the virtual register files may be of the same or different architectures. To effectuate the employment of a different collections of cache lines to be employed for different register sets of the virtual register file, for the illustrated embodiment, control unit 108 provides mapping unit 110 with different base addresses 106a and 106b during the different time periods. Except for this difference, the embodiment illustrated in FIG. 5 is otherwise substantial the same as the embodiment illustrated in FIG. 1. However, operationally, it is not necessary for control unit 108 to cause cache memory 102 to save and restore the current contents of cache lines 104a and 104b, when execution is switched between the two "register sets". Note that just like the embodiment of FIG. 1, the embodiment illustrated in FIG. 5 may also be extended to support SIMD. In an alternate embodiment, first and second collection of cache lines 104a and 104b are disposed in different cache memory.

Figure 6:
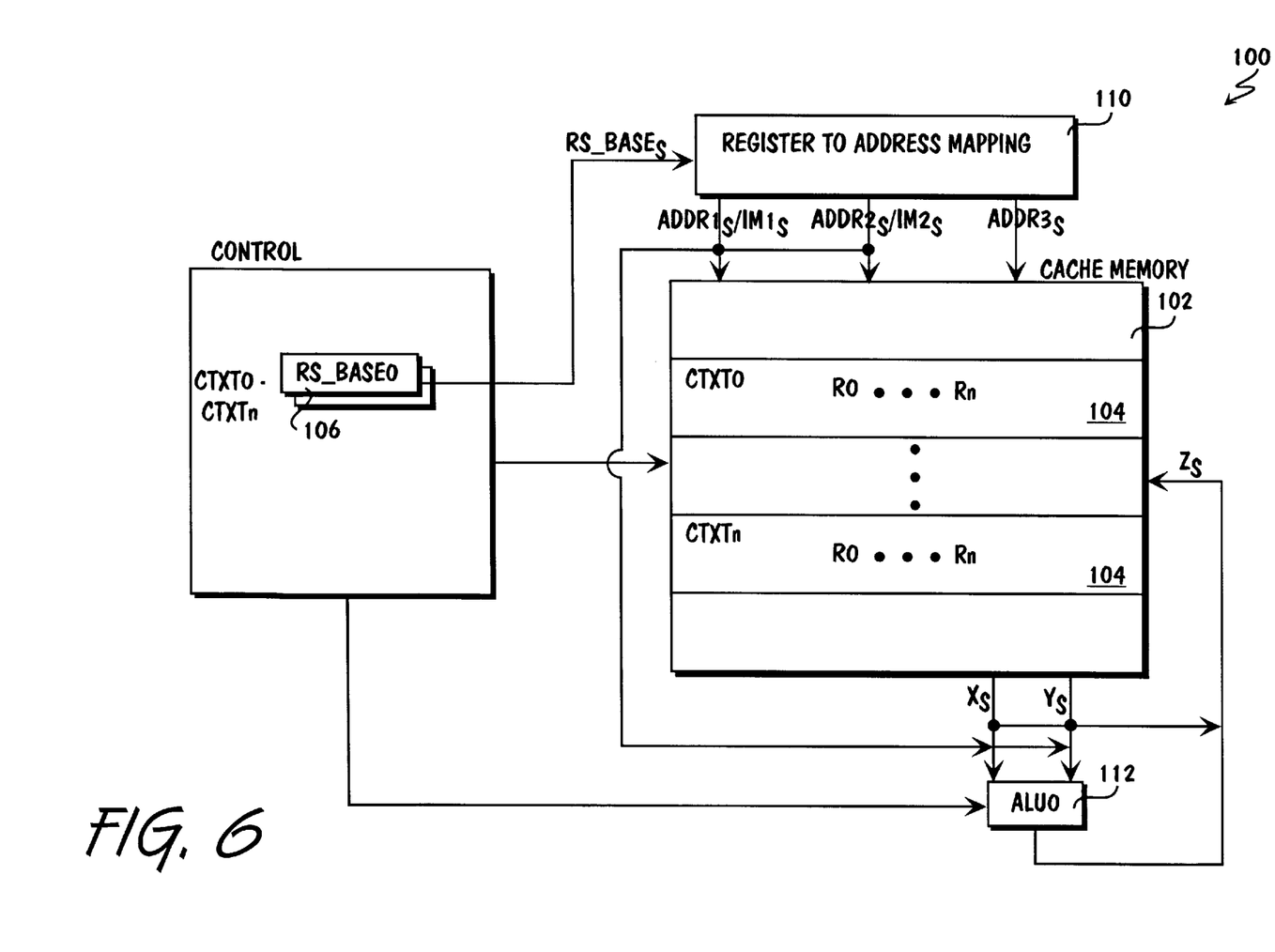

FIG. 6 illustrates yet another embodiment, where multiple collections of one or more cache lines of cache locations 104 are dynamically and concurrently operated as registers of multiple register sets of multiple virtual register files. Again, similar to the earlier described embodiments, the first and second virtual register files may be the same or different virtual register files, and if they are different, the virtual register files may be of the same or different architectures. For this embodiment, control unit 108 supplies mapping unit 110 with multiple base addresses 106 of the cache line collections 104, mapping unit 110 concurrently processes multiple instructions, outputting multiple cache addresses for the concurrently operated register sets at the same time. Additionally, multiple ALU are provided to allow the multiple sets of operands to be operated on at the same time. Note that just like the earlier described embodiments, the embodiment illustrated in FIG. 6 may also be extended to support SIMD. In an alternate embodiment, the multiple collections of cache lines 104 are disposed in different cache memory.

In yet another embodiment, control unit 108 and mapping unit 110 can also operate cache memory 102 to execute instructions, logically designating the variables to be used. In other words, in addition to the above described manner of executing instructions, where inputs and outputs of arithmetic/logic operations are specified in terms of registers and/or memory locations holding the operands, control unit 108 and mapping unit 110 can also operate cache memory 102 to execute instructions, where inputs and outputs of arithmetic/logic operations are specified in terms of the variables' identities. Operating cache memory 102 to execute instructions logically designating the variables to be used is the subject matter of the co-pending application, entitled Cache Memory Based Instruction Execution, filed contemporaneously, and having common inventor and assignee as the present application. The co-pending application is hereby fully incorporated by reference.

While the present invention has been described in terms of the above described embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

Thus, a cache memory based approach to instruction execution, with the cache memory operated to implement a virtual register file, has been disclosed.

What is claimed is:

1. An apparatus comprising:
cache memory having first one or more cache lines of cache locations; and
one or more control units coupled to said cache memory that dynamically operate said first one or more cache lines of cache locations during a first time period as registers of a first register set, and during a second time period as registers of a second register set;
wherein said one or more control units include a mapping unit coupled to said cache memory that operates to map during said first time period a first operand register designator of a first instruction to a first cache address of a first of the first one or more cache lines of cache locations being dynamically operated as a first register of the first register set, and to map during the second time period a second operand register designator of a second instruction to the same first cache address of the same first cache location being dynamically operated as a second register of the second register set.

2. The apparatus as set forth in claim 1, wherein the first and second register sets are register sets of a first virtual register file.

3. The apparatus as set forth in claim 1, wherein the first and second register sets are register sets of a first and a second virtual register file respectively.

4. The apparatus as set forth in claim 3, wherein the first and second virtual register files are of the same architecture.

5. The apparatus as set forth in claim 3, wherein the first and second virtual register files are of different architectures.

6. The apparatus as set forth in claim 1, wherein the mapping unit comprises circuitry that operates to determine during the first time period a first offset based on said first operand register designation, and to apply the first offset to a first base address of said first one or more cache lines of cache locations to generate the first cache address corresponding to the first cache location, and operates to determine during the second time period the same first offset based on said second operand register designation, and to apply the same first offset to the same first base address of said first one or more cache lines of cache locations to generate the same first cache address.

7. The apparatus as set forth in claim 1, wherein said one or more control units include a mapping unit coupled to said cache memory that operates to map during said first time period a first operand register designator of a first instruction to a first address tag associated with a first of the first one or more cache lines of cache locations being dynamically operated as a first register of the first register set, and to map during the second time period a second operand register designator of a second instruction to the same first address tag associated with the same first cache location being dynamically operated as a second register of the second register set.

8. The apparatus as set forth in claim 1, wherein the apparatus further comprises a first arithmetic logic unit (ALU) coupled to said cache memory that operates to perform during the first time period a first arithmetic/logic operation specified by a first instruction, including at least either employment of a first source operand retrieved from a first of the first one or more cache lines of cache locations being dynamically operated as a first register of the first register set or providing a first destination operand for storage in said first cache location, and operates to perform during the second time period a second arithmetic/logic operation specified by a second instruction, including at least either employment of a second source operand retrieved from the same first of the first one or more cache lines of cache locations being dynamically operated as a second register of the second register set, or providing a second destination operand for storage in said first cache location.

9. The apparatus as set forth in claim 8, wherein the apparatus further comprises a second arithmetic logic unit (ALU) coupled to said cache memory that operates to perform during the first time period the first arithmetic/logic operation specified by the first instruction, further including at least either employment of a third source operand retrieved from a second of the first one or more cache lines of cache locations being dynamically operated as a third register of a third register set or providing a third destination operand for storage in said second cache location, and operates to perform during the second time period the second arithmetic/logic operation specified by the second instruction, further including at least either employment of a fourth source operand retrieved from the same second of the first one or more cache lines of cache locations being dynamically operated as a fourth register of a fourth register set, or providing a fourth destination operand for storage in said second cache location.

10. The apparatus as set forth in claim 1, wherein
said cache memory further comprises first one or more cache tag storage locations corresponding to data storing cache locations of the first one or more cache lines; and
said one or more control units operate said cache memory as a write back cache, and store during the first time period, first one or more cache tags in the first one or more cache tag storage locations for the corresponding data storing cache locations of the first one or more cache lines, and during the second time, second one or more cache tags in the first one or more cache tag storage locations for the corresponding data storing cache locations of the first one or more cache lines, to effectuate said dynamic operation of said first one or more cache lines during the first time period as said first register set, and during the second time period as said second register set.

11. The apparatus as set forth in claim 1, wherein said cache memory further having second one or more cache lines of cache locations, and said one or more control units operate the second one or more cache lines of cache locations to cache data, concurrent with the first one or more cache lines being dynamically operated as registers of the first and second register sets.

12. A method comprising:
a) during a first time period, operating first one or more cache lines of cache locations as registers of a first register set to execute a first instruction; and
b) during a second time period, operating the same first one or more cache lines of cache locations as registers of a second register set to execute a second instruction; wherein
step (a) comprises mapping during said first time a first operand register designator of the first instruction to a first of the first one or more cache lines of cache locations being dynamically operated as a first register of the first register set, and
step (b) comprises mapping during the second time period a second operand register designator of the second instruction to the same first of the first one or more cache lines of cache locations being dynamically operated as a second register of the second register set.

13. A method comprising:
a) during a first time period, operating first one or more cache lines of cache locations as registers of a first register set to execute a first instruction:
b) during a second time period, operating the same first one or more cache lines of cache locations as registers of a second register set to execute a second instruction;
(c) during the first time period, performing a first arithmetic/logic operation specified by the first instruction, including at least either employment of a first source operand retrieved from a first of the first one or more cache lines of cache locations being dynamically operated as a first register of the first register set or providing a first designation operand for storage in said first cache location, and
(d) during the second time period, performing a second arithmetic/logic operation specified by a second instruction, including at least either employment of a second source operand retrieved from the same first of the first one or more cache lines of cache locations being dynamically operated as a second register of the second register set, or providing a second destination operand for storage in the same first cache location.

14. The method as set forth in claim 12, wherein the method further comprises the steps of:
(c) at the beginning of said first time period, storing first one or more cache tags for the first one or more cache lines in a first one or more cache tag storage locations corresponding to data storing cache locations of the first one or more cache lines to set up said first one or more cache lines to be dynamically operated as said first register set, and
(d) at the beginning of said second time period, saving the stored contents of said first one or more cache lines using said stored first one or more cache tags, and storing second one or more cache tags for the first one or more cache lines in the first one or more cache tag storage locations to set up said first one or more cache lines to be dynamically operated as said second register set of the virtual register file.

15. The method as set forth in claim 12, wherein the method further comprises
the step (c) operating a second one or more cache lines of cache locations to cache data, concurrent with the first one or more cache lines being dynamically operated as registers of the first and second register sets.

16. The method as set forth in claim 13, wherein the method further comprises the steps of:
(e) at the beginning of said first time period, storing first one or more cache tags for the first one or more cache lines in a first one or more cache tag storage locations corresponding to data storing cache locations of the first one or more cache lines to set up said first one or more cache lines to be dynamically operated as said first register set, and
(f) at the beginning of said second time period, saving the stored contents of said first one or more cache lines using said stored first one or more cache tags, and storing second one or more cache tags for the first one or more cache lines in the first one or more cache tag storage locations to set up said first one or more cache lines to be dynamically operated as said second register set of the virtual register file.

17. The method of claim 13, wherein the method further comprises the step (e) operating a second one or more cache lines of cache locations to cache data, concurrent with the first one or more cache lines being dynamically operated as registers of the first and second register sets.

* * * * *